(12) United States Patent
Mitra et al.

(10) Patent No.: US 10,528,448 B2
(45) Date of Patent: Jan. 7, 2020

(54) POST-SILICON VALIDATION AND DEBUG USING SYMBOLIC QUICK ERROR DETECTION

(71) Applicants: The Board of Trustees of the Leland Stanford Junior University, Palo Alto, CA (US); New York University, New York, NY (US)

(72) Inventors: Subhasish Mitra, Palo Alto, CA (US); Clark Barrett, Palo Alto, CA (US); David Lin, Palo Alto, CA (US); Eshan Singh, Palo Alto, CA (US)

(73) Assignees: The Board of Trustees of the Leland Stanford Junior University, Stanford, CA (US); New York University, New York, NY (US)

( * ) Notice: Subject to any disclaimer, the term of this patent is extended or adjusted under 35 U.S.C. 154(b) by 201 days.

(21) Appl. No.: 15/577,065

(22) PCT Filed: Jun. 6, 2016

(86) PCT No.: PCT/US2016/035987
§ 371 (c)(1),
(2) Date: Nov. 27, 2017

(87) PCT Pub. No.: WO2016/200723
PCT Pub. Date: Dec. 15, 2016

(65) Prior Publication Data
US 2018/0157574 A1    Jun. 7, 2018

Related U.S. Application Data

(60) Provisional application No. 62/172,091, filed on Jun. 6, 2015.

(51) Int. Cl.
*G06F 11/00* (2006.01)
*G06F 11/34* (2006.01)
(Continued)

(52) U.S. Cl.
CPC ...... *G06F 11/3466* (2013.01); *G06F 11/2236* (2013.01); *G06F 11/3003* (2013.01); *G06F 11/3024* (2013.01); *G06F 11/3079* (2013.01)

(58) Field of Classification Search
CPC .......... G06F 11/3466; G06F 11/2236; G06F 11/3003; G06F 11/3024; G06F 11/309;
(Continued)

(56) References Cited

U.S. PATENT DOCUMENTS 9,411,007 B2 * 8/2016 Bertacco ............ G01R 31/2601
9,928,150 B2 * 3/2018 Lin ..................... G06F 11/2236
(Continued)

OTHER PUBLICATIONS

Lin, David et al., Quick Detection of Difficult Bugs for Effective Post-Silicon Validation, Jun. 3-7, 2012, ACM (Year: 2012).*
(Continued)

*Primary Examiner* — Marc Duncan
(74) *Attorney, Agent, or Firm* — Kaplan Breyer Schwarz, LLP

(57) ABSTRACT

Disclosed are improved methods and structures for verifying integrated circuits and in particular systems-on-a-chip constructed therefrom. We call methods and structures according to the present disclosure Symbolic Quick Error Detection or Symbolic QED, Illustrative characteristics of Symbolic QED include: 1) It is applicable to any System-on-Chip (SoC) design as long as it contains at least one programmable processor; 2) It is broadly applicable for logic bugs inside processor cores, accelerators, and uncore components; 3) It does not require failure reproduction; 4) It does not require human intervention during bug localization; 5) It does not require trace buffers, 6) It does not require assertions; and 7) It uses hardware structures called "change detectors" which introduce only a small area overhead. Symbolic QED exhibits: 1) A systematic (and automated) approach to inserting "change detectors" during a design
(Continued)

phase; 2) Quick Error Detection (QED) tests that detect bugs with short error detection latencies and high coverage; and 3) Formal techniques that enable bug localization and generation of minimal bug traces upon bug detection.

10 Claims, 15 Drawing Sheets

(51) Int. Cl.
*G06F 11/22* (2006.01)
*G06F 11/30* (2006.01)

(58) Field of Classification Search
CPC ............... G06F 11/079; G06F 11/2205; G06F 11/2273; G06F 11/25
See application file for complete search history.

(56) References Cited

U.S. PATENT DOCUMENTS

| | | | |
|---|---|---|---|
| 2011/0087861 A1* | 4/2011 | Bertacco | G06F 11/263 712/202 |
| 2013/0285739 A1 | 10/2013 | Yves Blaquiere et al. | |
| 2014/0053026 A1 | 2/2014 | Zhong et al. | |
| 2015/0127983 A1 | 5/2015 | Trobough et al. | |

OTHER PUBLICATIONS

Abramovici, Miron et al., A Reconfigurable Design-for-Debug Infrastructure for SoCs, Jul. 24-28, 2006, ACM (Year: 2006).*

De Paula, Flavio M. et al., TAB-BackSpace: Unlimited-Length Trace Buffers with Zero Additional On-Chip Overhead, Jun. 5-10, 2011, ACM (Year: 2011).*

Hong, Ted et al., QED: Quick Error Detection Tests for Effective Post-Silicon Validation, 2010, IEEE (Year: 2010).*

Park, Sung-Boem et al., BLoG: Post-Silicon Bug Localization in Processors using Bug Localization Graphs, Jun. 13-18, 2010, ACM (Year: 2010).*

Park, Sung-Boem et al., Post-Silicon Bug Localization in Processors Using Instruction Footprint Recording and Analysis (IFRA), 2009, IEEE (Year: 2009).*

Friedler, Ophir et al., Effective Post-Silicon Failure Localization Using Dynamic Program Slicing, 2014, IBM Research (Year: 2014).*

Chang K. et al., Chapter 8:Bug Trace Minimization. In: Functional Design Errors in Digital Circuits. Lecture Notes in Electrical Engineering, 2009, Springer, Dordrech, vol. 32 (Year: 2009).*

Authorized Officer: Shane Thomas, "International Search Report" issued in counterpart PCT application No. PCT/US2016/035987, dated Sep. 1, 2016.

Authorized Officer: Shane Thomas, "Written Opinion" issued in counterpart PCT application No. PCT/US2016/035987, dated Sep. 1, 2016.

"Supplementary European Search Report", Issued in Related European Patent Application EP 16 80 8080, dated May 8, 2018, 11 pp.

Lin et al., "Effective Post-Silicon Validation of System-on-Chips Using Quick Error Detection", IEEE Transactions on Computer-Aided Design of Integrated Circuits and Systems, Oct. 1, 2014, pp. 1573-1590, vol. 33, No. 10.

Lin et al., "Quick Error Detection Tests with Fast Runtimes for Effective Post-Silicon Validation and Debug", 2015 Design, Automation & Test in Europe Conference and Exhibition, EDAA, Mar. 9, 2015, pp. 1168-1173.

* cited by examiner

```
INPUT: enable, instruction_in, target_address, committed
OUTPUT: pc, pc_override, instruction_out,
              instruction_override, qed_ready
// initialization
current_mode←ORIG_MODE;
qed_rewind_address←start address of test;
qed_ready←false;
PC_override_i←false;
instruction_override_i←false;
qed_ready_i←false;
// end initialization
PC_override←enable ? 0: PC_override_i;
instruction_override←enable ? 0: instruction_override_i;
// wait for instructions to commit, then set qed_ready
if(enable==1) and (committed==1), then
    qed_ready←qed_ready_i;
else
    qed_ready←false;
endif
if current_mode==ORIG_MODE, then
    qed_ready_i←false
    if is_control_flow_instruction(instruction_in), then
        current_mode←DUP_MODE:
        PC←qed_rewind_address;
        PC_override_i←1;
    end if
end if
if current_mode==DUP_MODE, then
    if is_control_flow_instruction(instruction_in), then
        qed_ready_i←true:
        current_mode←ORIG_MODE;
        qed_rewind_address←target_address;
    else
        qed_ready←false;
        if is_arithmetic_logical_move_instruction(instruction_in), then
            instruction_out=create_duplicated_version(instruction_in);
            instruction_override_i←1;
        else if is_load_store_instruction(instruction_in), then
            instruction_out=create_duplicated_version(instruction_in);
            instruction_override_i←1;
        end if
    end if
end if
```

*FIGURE 4*

R1 = R2 + R3
R4 = LD[A]
R5 = R1 + R4
ST [B] = R5
BRANCH label

*FIGURE 5(A)*

R1 = R2 + R3
R4 = LD[A]
R5 = R1 + R4
ST [B] = R5
R[17] R18 + R19
R20 = LD[A']
R21 = R17 + R20
ST [B'] = R21
BRANCH label // qed_ready←true

*FIGURE 5(B)*

```
//initialization
R1 = 1
R2 = 2
R3 = 3
R4 = 4
R5 = 5
R6 = 6
//code
R1 = R2 + R3
R4 = R1 - R4
R4 = R1 - R4
BNE R4
:
```

FIGURE 13(A)

```
//initialization
R1 = 1      R17 = 1
R2 = 2      R18 = 2
R3 = 3      R19 = 3
R4 = 4      R20 = 4
R5 = 5      R21 = 5
R6 = 6      R22 = 6
//code
R1  = R2  + R3
R4  = R5  - R6
R4  = R1  - R4
R17 = R18 + R19
R20 = R21 - R22
R20 = R17 - R20
CMP R7, R23
BNE ERROR_DETECTED
BNE R4
:
```

FIGURE 13(B)

TRANSFORMED CODE

```
...
<PLC OPERATION>
R1  = R2  + R3
R17 = R18 + R19
R4  = R5  - R6
R20 = R21 - R22
<PLC OPERATION>
R7  = R1  - R4
R23 = R17 - R20
R9  = R7  * R8
R25 = R23 * R24
<PLC OPERATION>
...
```

*FIGURE 14(A)*

PLC OPERATION

```
for <A,A'> in PLC_list do
    LOCK (A)
    LOCK (A')
    Rt  = LD(A)
    Rt' = LD(A')
    UNLOCK (A)
    UNLOCK (A')
    CMP Rt, Rt'
    BNE ERROR_DETECTED
end for
```

*FIGURE 14(B)*

POST-SILICON VALIDATION AND DEBUG USING SYMBOLIC QUICK ERROR DETECTION

CROSS REFERENCE TO RELATED APPLICATION

This application claims the benefit of U.S. Provisional Application Ser. No. 62/172,091 filed 6 Jun. 2015.

TECHNICAL FIELD

This disclosure relates generally to integrated circuits (ICs) and more particularly to methods and structures for effective post-silicon validation and debug of integrated circuits including systems-on-a-chip (SoC).

BACKGROUND

As will be readily appreciated by those skilled in the art, the functionality and ubiquity of integrated circuits and systems constructed thereon has progressed at a breathtaking pace. Consequently, such circuits and systems have had a profound impact on contemporary society. Given their importance, methods and structures for the verification and/or validation of these circuits and systems would represent a welcome addition to the art.

SUMMARY

An advance in the art is made according to an aspect of the present disclosure directed to improved methods and structures for verifying, validating and debugging integrated circuits and systems-on-a-chip constructed therefrom.

We call methods and structures according to the present disclosure Symbolic Quick Error Detection or Symbolic QED. Illustrative characteristics of Symbolic QED include: 1) It is applicable to any System-on-Chip (SoC) design as long as it contains at least one programmable processor (a generally valid assumption for existing SoCs); 2) It is broadly applicable for logic bugs inside processor cores, accelerators, and uncore components; 3) It does not require failure reproduction; 4) It does not require human intervention during bug localization; 5) It does not require trace buffers; 6) It does not require assertions; and 7) It uses hardware structures called "change detectors" which introduce only a small area overhead We demonstrate the effectiveness and practicality of Symbolic QED by showing that: 1) Symbolic QED correctly and automatically localizes difficult logic bugs in a few hours (less than 7 on OpenSPARC) that would take days or weeks to localize using traditional approaches; 2) For each detected bug, Symbolic QED provides a set of candidate components representing the possible locations of the bug in the design; 3) For each detected bug, Symbolic QED automatically generates a minimal bug trace using formal analysis; and 4) Symbolic QED generates bug traces that are up to 6 orders of magnitude shorter than those produced by traditional post-silicon techniques and 5 orders of magnitude shorter than QED.

Symbolic QED relies on the following steps that work together in a coordinated fashion: 1) A systematic (and automated) approach to inserting "change detectors" during a design phase; 2) Quick Error Detection (QED) tests that detect bugs with short error detection latencies and high coverage; and 3) Formal techniques that enable bug localization and generation of minimal bug traces upon bug detection.

In sharp contrast to prior-art methods, Symbolic QED automatically localizes logic bugs in SoCs during post-silicon validation and debug thus enabling extremely quick error detection and localization advantageously producing improved performance of both the debugging and the resulting systems along with significant productivity and time-to-market gains.

BRIEF DESCRIPTION OF THE DRAWING

A more complete understanding of the present disclosure may be realized by reference to the accompanying drawing in which:

FIG. 4 shows a pseudo code listing for an illustrative QED module according to an aspect of the present disclosure;

FIGS. 5(A) and 5(B) shows illustrative examples of QED transformation by the QED module for FIG. 5(A) a sequence of original instructions; and FIG. 5(B) the actual instructions executed according to an aspect of the present disclosure;

FIGS. 13(A) and 13(B) shows an original test (FIG. 13(A)) and a transformed test (FIG. 13(B)) of an illustrative EDDI-V example according to the present disclosure with inst_min=inst_mar=3; and FIGS. 14(A) and 14(B) shows transformed code (FIG. 14(A)) and PLC Operation (FIG. 14(B)) for a PLC transformation example with inst_min=inst_max=4 according to an aspect of the present disclosure.

DETAILED DESCRIPTION

Figure 1:
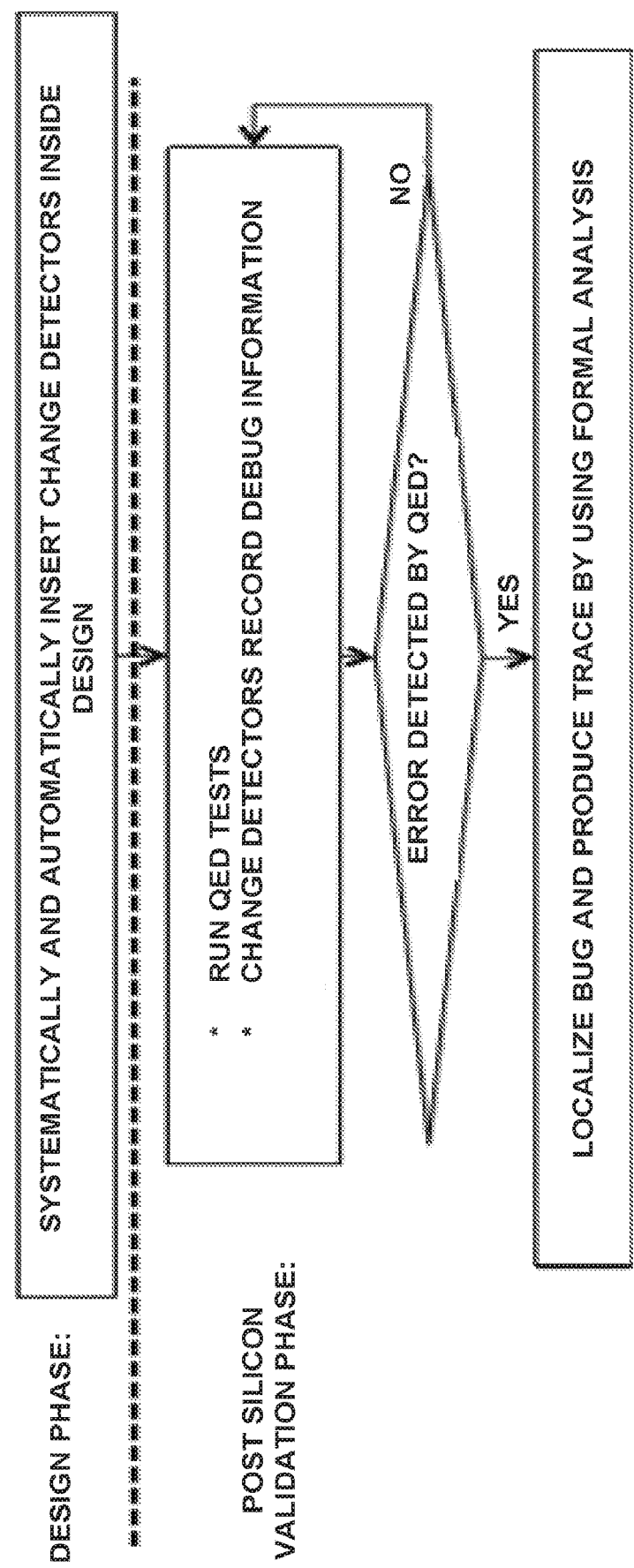
FIG. 1 shows a schematic flow chart depicting an overview of symbolic QED according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

Glossary

The following Glossary includes definitions provided to assist in further understanding the disclosure.

Quick Error Detection (QED)—a technique involving the transformation of existing post-silicon validation test(s) into new validation tests that reduce error detection latency. QED transformations allow flexible tradeoffs between error detection latency, coverage, and complexity and may be implemented in software with little or no hardware changes.

Bug—an error, flaw, failure, or fault in a computer program or system that causes or otherwise contributes to it producing an incorrect or unexpected result or to behave in unintended ways.

Electrical Bugs—are a type of bug that only manifests itself under specific operating conditions (voltage, frequency, temperature, etc.) and may be caused by design marginalities, synchronization problems, noise, etc.

Logic bugs—are a type of bug that is caused by one or more design error(s). Logic bugs include incorrect hardware implementations or incorrect interactions between the hardware implementation and low-level system software (e.g., firmware).

System on a Chip (SoC)—an integrated circuit (IC) that integrates all components of a system into/onto a single chip or integrated package of chips. It may contain digital, analog, mixed-signal, and radio frequency functions. SoC may also refer to technology(ies) that package or otherwise integrate all parts for a system on a single integrated circuit.

Uncore—are components in a SoC that are neither processor cores nor ~processors (e.g., graphical processing tmits). Examples of uncore components include cache controllers, memory controllers, and interconnection network.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

By way of some additional background, we begin by noting that post-silicon validation and debug of integrated circuits has become a critically important step with respect to their design, test, manufacture and support. Generally, post-silicon validation and debug is the last step in the development of a semiconductor IC and occurs between pre-silicon verification and high volume manufacturing.

Notably, post-silicon verification, validation and debug is contrasted with pre-silicon verification or debug processes, wherein during pre-silicon process(es), devices are generally tested in a virtual environment with sophisticated simulation, emulation and cformal verification tools.

Unfortunately, pre-silicon verification processes alone are inadequate for verifying correct operation of contemporary ICs and in particular SoCs. As will be appreciated by those skilled in the art, such traditional, prior art pre-silicon techniques are generally too slow and do not adequately address electrical bugs. Consequently, there is growing reliance by those skilled in the art on system-level validation (i.e., emulation) and post-silicon validation (PSV) techniques.

In sharp contrast to pre-silicon validation processes, during post-silicon validation and debug, actual fabricated ICs are tested in actual system operating environments (i.e., speed, real boards etc. using logic analyzer(s) and other assertion based tools) to detect and fix design or other flaws (generally referred to as bugs). Correct post-silicon validation and debug therefore, is crucial because—as noted above—pre-silicon verification alone is oftentimes inadequate to detect all possible bugs.

It is noted further that costs of post-silicon validation and debug are rising. Massive integration of a wide variety of components into extremely complex SoCs—which may include multiple processor cores, accelerators for graphics or cryptography as well as uncore components (also referred to as nest or northbridge components)—significantly exacerbates post-silicon validation and debug challenges.

Generally, post-silicon validation and debug of an IC involves three activities namely:
1) Detecting a bug by applying appropriate stimuli (i.e., test programs);
2) Localizing the bug to a small region inside the IC; and
3) Fixing the bug through software patches, circuit editing, or silicon "re-spin".

At this point it is noted that effort(s) to localize the bug from an observed failure (post-silicon bug localization) oftentimes dominates the cost(s) of post-silicon validation and debug. Such post-silicon bug localization involves identifying a sequence of inputs (e.g., instructions) that activate and detect the bug (also referred to as a bug trace), and any physical hardware (design block) where the bug is (possibly) located.

As will be readily appreciated by those skilled in the art, post-silicon bug localization is particularly difficult because many existing post-silicon techniques rely on: 1) system, level simulation to obtain expected or "golden" system response; and/or 2) failure reproduction—which involves returning the system to an error-free state and rerunning the system with the exact input stimuli (e.g., validation test instructions; validation test inputs; voltage, temperature, and frequency operation conditions; and interrupts)—to reproduce the failure.

Accordingly, methods and structures according to the present disclosure will be appreciated by those skilled in the art as a systematic and automated technique that localizes logic bugs in ICs as well as sophisticated SoCs. As will be further appreciated, without such effective methods and structures for verifying the correct operation of such ICs and SoCs—future systems constructed therefrom will remain vulnerable to logic and electrical bugs that could possibly compromise correct circuit and/or system operation.

We call methods and structures according to the present disclosure Symbolic Quick Error Detection or Symbolic QED. Illustrative characteristics of Symbolic QED include: 1) It is applicable to any System-on-Chip (SoC) design as long as it contains at least one programmable processor (a generally valid assumption for existing SoCs); 2) It is broadly applicable for logic bugs inside processor cores, accelerators, and uncore components; 3) It does not require failure reproduction; 4) It does not require human intervention during bug localization; 5) It does not require trace buffers; 6) It does not require assertions; and 7) It uses hardware structures called "change detectors" which introduce only a small area overhead (1.86% on OpenSPARC).

We demonstrate the effectiveness and practicality of Symbolic QED by showing that: 1) Symbolic QED correctly and automatically localizes difficult logic bugs in a few hours (less than 7 on OpenSPARC) that would take days or weeks to localize using traditional approaches; 2) For each detected bug, Symbolic QED provides a set of candidate components representing the possible locations of the bug in the design; 3) For each detected bug, Symbolic QED automatically generates a minimal bug trace using formal analysis; and 4) Symbolic QED generates bug traces that are up to 6 orders of magnitude shorter than those produced by traditional post-silicon techniques and 5 orders of magnitude shorter than QED.

As we shall describe and will be appreciated by those skilled in the art, Symbolic QED employs the following methodologies which advantageously work together in a coordinated fashion namely, 1) A systematic (and automated) approach to inserting "change detectors" during design phase(s); 2) Quick Error Detection (QED) tests that detect bugs exhibiting short error detection latencies and high coverage; and 3) Formal techniques that enable bug localization and generation of minimal bug traces upon bug detection.

An overview of Symbolic QED according to the present disclosure may be observed with reference to FIG. 1. As may be observed, Symbolic QED involves two distinct phases namely, a design phase and a post-silicon validation phase. As depicted in that figure, the design phase systematically and automatically inserts change detectors inside a design. The post-silicon validation phase involves running QED tests wherein change detectors record debug information and if errors are detected then localizing bug(s) and producing bug trace reports by formal analysis.

Motivating Example

We now present and describe a bug scenario abstracted from an actual—and difficult to detect—bug found during post-silicon validation of a commercial multicore SoC. That scenario is described as: Two stores in 2 cycles to adjacent cache lines in a cache delay the next cache coherence message received by that cache by 5 clock cycles.

The bug is only activated when two store operations occur within 2 clock cycles of each other to adjacent cache lines. The next cache coherence message (e.g., invalidation) is delayed because of a delay in the receive buffer of the cache (these details were not known before the bug was found and localized).

Figure 2:
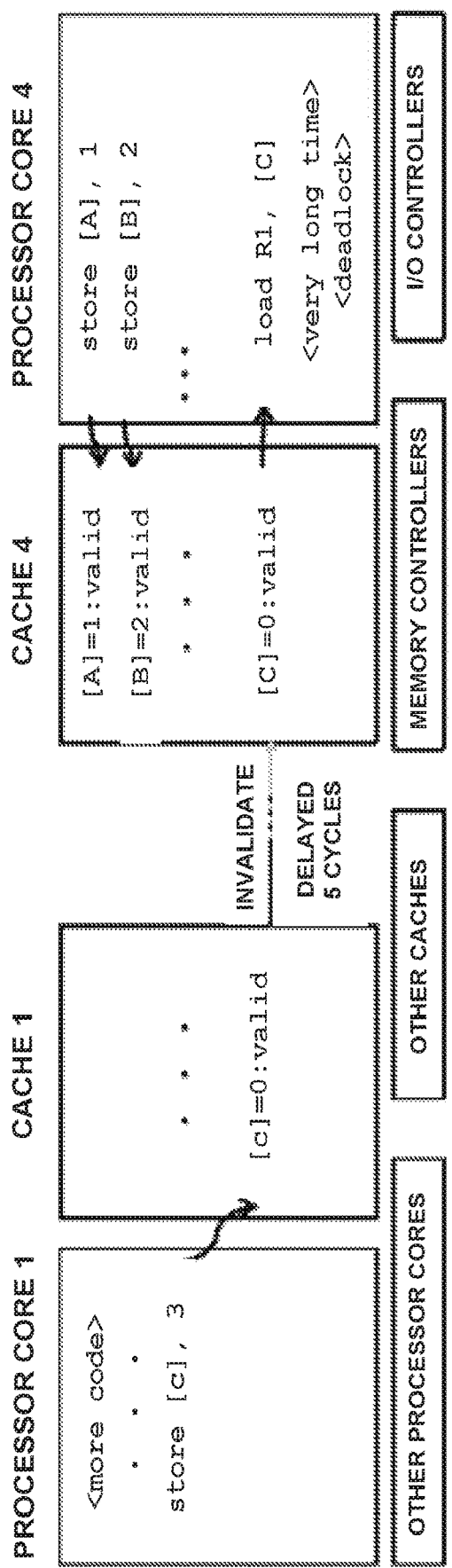
FIG. 2 shows an example bug scenario according to an aspect of the present disclosure.

During post-silicon validation, a test running on the SoC created a deadlock. As shown in FIG. 2, the deadlock occurs because one of the processor cores (core 4) performs a store to memory location [A] followed by a store to memory location [B] within 2 clock cycles ([A] and [B] are cached on adjacent cache lines). As a result, the example bug scenario is activated in cache 4.

After the bug is activated, processor core 1 performs a store to memory location [C]. Since memory location [C] is cached in multiple caches (cache 1 and cache 4), the store operation to memory location [C] has to invalidate other cached copies of memory location [C] (including the cached copy in cache 4). However, due to the bug, an invalidation message received by cache 4 is delayed by 5 clock cycles.

Before any invalidation occurs, processor core 4 loads from memory location [C]. Since the cached copy of memory location [C] in cache 4 is still marked as valid, it loads this stale copy (which contains the wrong value at this point). Then, millions of clock cycles later, processor core 4 uses the wrong value of memory location [C] in code that performs locking, resulting in deadlock.

When deadlocks such as this are detected (e.g., by using a timeout), the bug must be localized by identifying the bug trace and the component where the bug is located. Since it is not known a priori when the bug was activated or when the system entered deadlock, it can be very difficult to obtain the bug trace.

Additionally, the bug trace can be extremely long due to the long error detection latency, containing many extraneous instructions unnecessary for activating or detecting the bug. As mentioned above, such bugs can be extremely challenging to localize using traditional approaches like failure reproduction, trace buffers, simulation, or naïve formal methods.

Advantageously—and as we shall describe—Symbolic QED correctly localizes this bug to cache 4 and produces a bug trace that is only 3 instructions long. Of further advantage, Symbolic QED produces this trace in only 2.5 hours—automatically—without requiring failure reproduction or trace buffers.

In sharp contrast, traditional post-silicon bug localization approaches would likely require manual effort or trace buffers (or both) and could take days or weeks. Of further advantage, Symbolic QED also provides opportunities for bug detection and localization during emulation-based verification such that even this drastically shortened bug detection and localization may be circumvented entirely by methods according to the present disclosure namely, Symbolic QED.

Quick Error Detection (QED)—Generic QED is known to quickly detect bugs inside processor cores as well as uncore components. The software-only QED technique automatically transforms existing post-silicon validation tests (original tests) into new QED tests using various QED transformations e.g., Error detection using Duplicated Instructions for Validation (EDDI-V) and Proactive Load and Check (PLC).

EDDI-V—EDDI-V targets processor core bugs by frequently checking results of original instructions against results of duplicated instructions created by EDDI-V. First, registers and memory space are divided into two halves, one for original instructions and one for duplicated instructions. Next, corresponding registers and memory locations for the original and the duplicated instructions are initialized to the same values. Then, for every load, store, arithmetic, logical, shift, or move instruction in the original test, EDDI-V creates a corresponding duplicate instruction that performs the same operation—but only for registers and memory reserved for duplicate instructions.

The duplicated instructions execute in the same order as original instructions. The EDDI-V transformation also inserts periodic check instructions (called Normal checks) that compare the results of the original instructions against those of the duplicated instructions.

Accordingly, for every duplicated load instruction, an additional Load check instruction is inserted immediately after (before the loaded values are used by any other instructions) to check that the value loaded by the original instruction matches the value loaded by the corresponding duplicated instruction. Similarly, for store instructions, a Store check instruction is inserted immediately before the original store instruction to check that the value about to be stored matches the value about to be stored by the duplicated instruction. Each check instruction is of the form:

CMP Ra, Ra' where Ra and Ra' are an original and (corresponding) duplicate register respectively. A mismatch in any check instruction indicates an error. In order to minimize any intrusiveness that might prevent bug detection by QED, insertion of the duplicated instructions and the check instructions is controlled by parameters Inst_min and Inst_max, the minimum and maximum number of instructions from the original test that must execute before any duplicated or check instructions execute.

PLC—PLC targets bugs inside uncore components by frequently and proactively performing loads from memory (through uncore components) and checking the values loaded. PLC first transforms an original test into an EDDI-V-transformed QED test. Next, PLC inserts Proactive Load and Check (PLC) operations throughout the transformed test. PLC operations run on all cores and all threads.

Each PLC operation loads from a selected set of variables and performs checks to check the loaded values. Since the PLC test includes EDDI-V, each PLC operation loads a variable A and its duplicated version A' and performs a PLC check as follows: LOCK(A); LOCK(A'); Ra=LD(A) Ra'=LD(A') UNLOCK(A'); UNLOCK(A); CMP Ra, Ra'// compare & detect error Any mismatch indicates an error. Each PLC operation iterates through all the variables selected for PLC check as follows:

```
LOCK(A);
LOCK(A');
Ra = LD(A)
Ra' = LD(A')
UNLOCK(A');
UNLOCK (A);
CMP Ra, Ra'     //compare & detect error
```

Any mismatch indicates an error. Each PLC operation iterates through all of the variables selected for PLC.

Symbolic QED—As we shall show and describe, Symbolic QED localizes bugs and automatically produces short bug traces that typically have only a few instructions (often less than 10). Within the space of QED-compatible bug traces (explained below), the traces produced by Symbolic QED are minimal, meaning no shorter bug traces exist. As will be readily understood and greatly appreciated by those skilled in the art, short bug traces—such as those produced by Symbolic QED—make bugs easier to understand and fix.

Symbolic QED employs bounded model checking (BMC) used in formal verification. Given a model of a system (e.g., the RTL) and a property to be checked (e.g., a check inserted by QED), the system is formally analyzed to see if the property can be violated in a bounded number of steps (clock cycles). If so, a counterexample (a concrete trace violating the property) is produced. As is known, BMC guarantees that if a property can be violated, a minimal-length counterexample is returned.

At this point we must first review three challenges associated with using BMC for post-silicon bug localization. First, BMC needs a property to solve for. Since bugs are not known a priori, it is difficult to craft such properties (and avoid false positives). Second, large design sizes limit the effectiveness of BMC. If a design is too large, a typical BMC tool may not even be able to load the design. And even if a large design can be loaded, running BMC on that design will—in all likelihood—be very slow—maybe unworkably so. Third, the performance of BMC techniques is affected by the number of cycles required to trigger a bug. More particularly, as the number of cycles required to trigger the bug increases, BMC performance slows down, especially for large designs. Thus, unless a short counter-example exists, BMC will take too long or may be unable to find it at all.

We will discuss the Second challenge later. Here we will discuss the First and Third challenges. As will be understood and appreciated by those skilled in the art, one key element of solving such problems is to create a BMC problem that searches through all possible QED tests. As is known, QED tests are excellent for detecting a wide variety of bugs. QED tests are also designed to be able to find errors quickly. By searching all possible QED tests using minimality guarantees of BMC, it is usually possible to find a very short trace triggering the bug. With this understanding in place, we now describe the details of Symbolic QED.

Solving for QED-Compatible Bug Traces Using BMC

QED tests provide very succinct properties to check using check instructions of the form:

CMP Ra, Ra'

For PLC checks and Load checks, Ra and Ra' hold values loaded from uncore components, whereas for Normal checks and Store checks, Ra and Ra' hold the results of computations executed on the processor core. An error is detected when the two registers are not equal. Therefore, we use BMC to find counter-examples to properties of the form:

Ra==Ra' where Ra is an original register and Ra' is the corresponding duplicated register. However, without additional constraints, the BMC engine will find trivial counter-examples that do not correspond to real bugs. In order to ensure that BMC-generated traces do correspond to actual bugs, we require that counterexamples must be QED-compatible.

We define a QED-compatible trace as a sequence of inputs with the following properties:

1. Inputs must be valid instructions (specifications of valid instructions can be directly obtained from Instruction Set Architecture (ISA) of processor cores;

2. Registers and memory space(es) are divided into two halves, one for "original" instructions and one for "duplicated" instructions. For every instruction (excluding control-flow changing instructions) that operates on the registers and memory space allocated for the original instructions, there exists a corresponding duplicated instruction that performs the same operation but operates on the registers and memory space allocated for the duplicated instructions.

3. The sequence of original instructions and the sequence of duplicated instructions must execute in the same order.

4. A comparison (for example, a property checked by the BMC tool) between an original register R and its corresponding register R' occurs only if the original and duplicate instructions are in sync, i.e. for each original instruction that has been executed, its corresponding duplicate instruction has also been executed.

QED Module

Ensuring that only QED-compatible bug traces are considered by BMC requires constraining inputs to the design. This is accomplished by adding a new QED module to a fetch stage of each processor core during BMC. Note that the QED module is only used within the BMC tool and is not added to the manufactured IC.

Advantageously, the QED module only needs to be designed once for a given ISA, and made available as a "library component" for use during validation. The design of a QED module is simple, and can be tested in only a few minutes.

The QED module automatically transforms a sequence of original instructions into a QED-compatible sequence. Any control-flow altering instruction determines the end of the "sequence of original instructions." The QED module only requires that the sequence is in fact made up of valid instructions and that they read from or write to only the registers and memory allocated for the original instructions (conditions that can be specified directly to the BMC tool). The sequence of original instructions is first executed unmodified (up to but not including the control-flow instruction). Then it is executed a second time—but instead of using the original registers and memory, the instructions are modified to use the registers and memory allocated for the duplicated instructions. Since duplication is triggered only by a control-flow instruction, the QED module does not use a fixed value for Inst_min and Inst_max. The values are dynamically determined by the length of the sequence of original instructions. This makes it easy for the BMC tool to implicitly (and simultaneously) search through all sequences of instructions and all values of Inst_min and Inst_max.

After the second execution, a signal is asserted to indicate that the original and corresponding duplicated registers should contain the same values under bug-free situations, i.e., the BMC tool should check the property Ra==Ra'.

Figure 3:
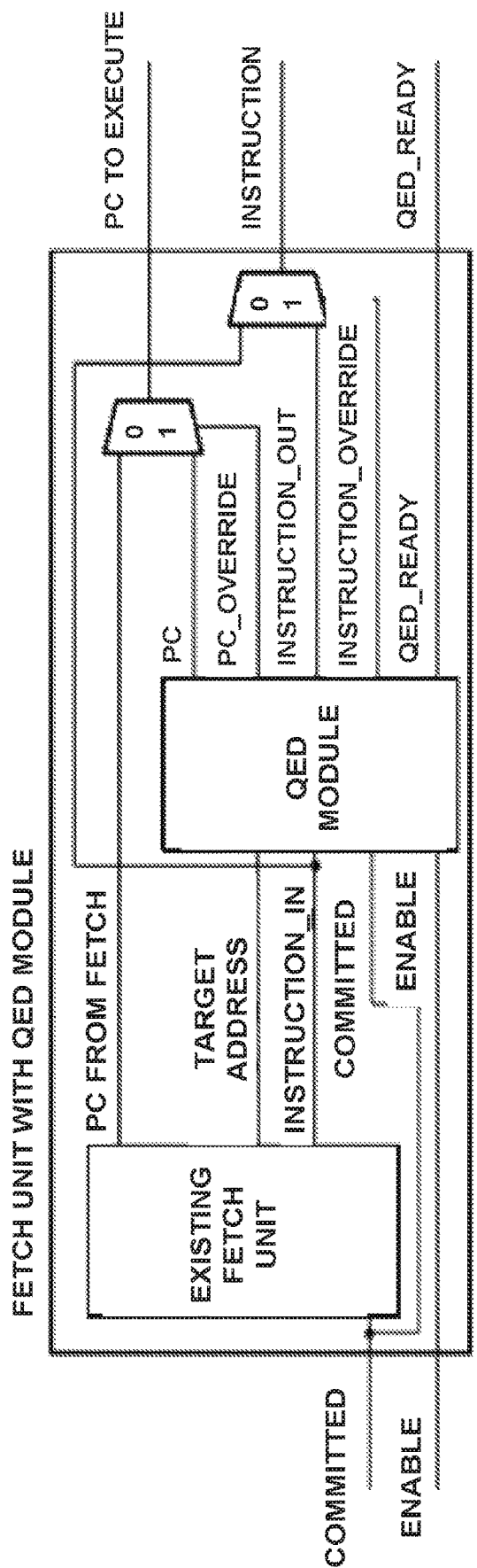
FIG. 3 shows a schematic block diagram showing an illustrative QED module interface according to an aspect of the present disclosure.

FIG. 3. shows how the QED module integrates with a fetch unit. The pseudo code of the QED module is shown in FIG. 4. As may be observed from FIG. 3, The inputs to the QED module are: 1) enable, which disables the QED module if 0; 2) instruction_in, which is the instruction from the fetch unit to be executed by the processor core; 3) target_address, which contains the address of the next instruction to execute when the processor executes a control-flow instruction; and 4) committed, which is a signal from the processor core to indicate if the instruction fetched has been committed (i.e., the result written to register or memory).

With continued reference to FIG. 3, it may be observed that outputs from the QED module are: 1) PC, which is the address of the next instruction to fetch; 2) PC_override, which determines if the processor core should use the PC from the QED module or the PC from the fetch unit; 3) instruction_out, which is the modified instruction computed by the QED module; 4) instruction_override, which determines whether the processor core should use the modified instruction from the QED module or the instruction from the fetch unit; and 5) qed_ready, which is set to qed_ready_i if the committed input signal is true, and false otherwise.

As may be observed with reference to FIG. 4, the QED module has internal variables: 1) current_mode, which tracks whether the QED module is executing original instructions (ORIG_MODE) or duplicated instructions (DUP_MODE); 2) qed_rewind_address, which holds the address of the first instruction in the sequence of original instructions; 3) PC_override_i and instruction_override_i, which are internal versions of PC_override and instruction_override (the only difference is that when the enable signal is set to 0, then both PC_override and instruction_override are also set to 0, disabling the QED module); and 5) qed_ready_i, which signals when both the original and duplicated registers should have the same values (under bug-free conditions). Initially, qed_ready_i is set to false, and is only set to true when both the original and duplicated instructions have executed.

The QED module starts in ORIG_MODE. When a control flow instruction is fetched, the QED module switches to DUP_MODE, loads the address stored in qed_rewind_address into PC, and sets PC_override_i to 1 (and as long as enable is true, PC_override is also set to 1). The processor core then re-executes instructions starting from the address stored in qed_rewind_address.

In DUP_MODE mode, the duplicated instruction is output as instruction_out, and instruction_override_i is set to 1 so the core executes the duplicated instruction instead of the original instruction from the fetch unit. After all the duplicated instructions finish execution, the corresponding registers should be equal, and so once the results are written to registers (the committed signal from the processor core is true), qed_ready is set to true. This time, the processor will execute the control flow instruction and the QED module will store the address of the next instruction to execute (i.e., the target of the control flow instruction) in qed_rewind_address and then return to ORIG_MODE. An example of the transformation performed by the QED module is shown in FIG. 5. More particularly, one can observe in FIG. 5, a sequence of original instructions and actual instructions executed.

Initial State

As may be understood and appreciated by those skilled in the art, the approach outlined above ensures that only QED-compatible traces are considered by BMC. However, the initial state for the BMC run must be a QED-consistent state to ensure that no false counter-examples are generated. That is, the value of each register and memory location allocated for original instructions must match the corresponding register or memory location for duplicated instructions. One approach would be to start the processor from its reset state. However, the reset state may not be QED-consistent (or it may be difficult to confirm whether it is). Some designs also go through a reset sequence that may extend the number of cycles, making the BMC problem more difficult. For example, for OpenSPARC T2, only one processor core is active after a reset, and the system executes a sequence of initialization instructions (approximately 600 clock cycles long) to activate the other cores in the system.

It is advantageous to start from a QED-consistent state after the system has executed the reset sequence (if any) to improve the runtime of BMC. One way to obtain a QED-consistent state—according to the present disclosure—is to run "some" QED program (independent of specific tests for bug detection) in simulation and stop immediately after QED checks have compared all of the register and memory values (this ensures that each "original" register or memory location has the same value as its corresponding "duplicate" register or memory location). The register and memory values are read out of the simulator and used to set the register and memory values of the design when preparing to run BMC. One can obtain these values using ultrafast simulators (not RTL) that can easily simulate large designs with thousands of processor cores. Therefore, this step does not affect the scalability of Symbolic QED.

Finding Counter-Examples Using BMC

After inserting the QED module and setting the initial state, we use BMC to find a counter-example to the property:

$$qed_{ready} \rightarrow \Lambda_{a \in \{0 \ldots \frac{n}{2}-1\}} Ra == Ra'$$

where n is the number of registers defined by the ISA. Here, (for $a \in \{0 \ldots n/2-1\}$), Ra corresponds to a register allocated for original instructions and Ra' corresponds to a register allocated for duplicated instructions. We allow the instructions chosen by BMC to include load and store instructions, enabling our approach to activate and detect bugs in uncore components as well as those in processor cores.

Handling Large Designs

As will be readily appreciated by those skilled in the art, a state-of-the-art commercial BMC tool may not be able to load a complete SoC (this is the case for OpenSPARC T2 for example). Here, we discuss three techniques for handling such large designs.

Bugs Inside Processor Cores Vs. Outside Processor Cores

If a QED test fails either a Normal check or a Store check, we can immediately deduce that the bug is inside the processor core where the check failed. This is because by design, Normal and Store checks catch any incorrect value produced by a processor core before it leaves the processor core and propagates to the uncore components or to other processor cores. Thus, we just need to perform BMC on the single processor core where the check failed in order to find counter-examples. If the test fails at a Load check or a PLC check, we cannot immediately infer where the bug is. For these cases, we consider two approaches, Change Detectors and Partial Instantiation, to simplify the design to be analyzed by BMC.

Change Detectors

Figures 6A, 6B:
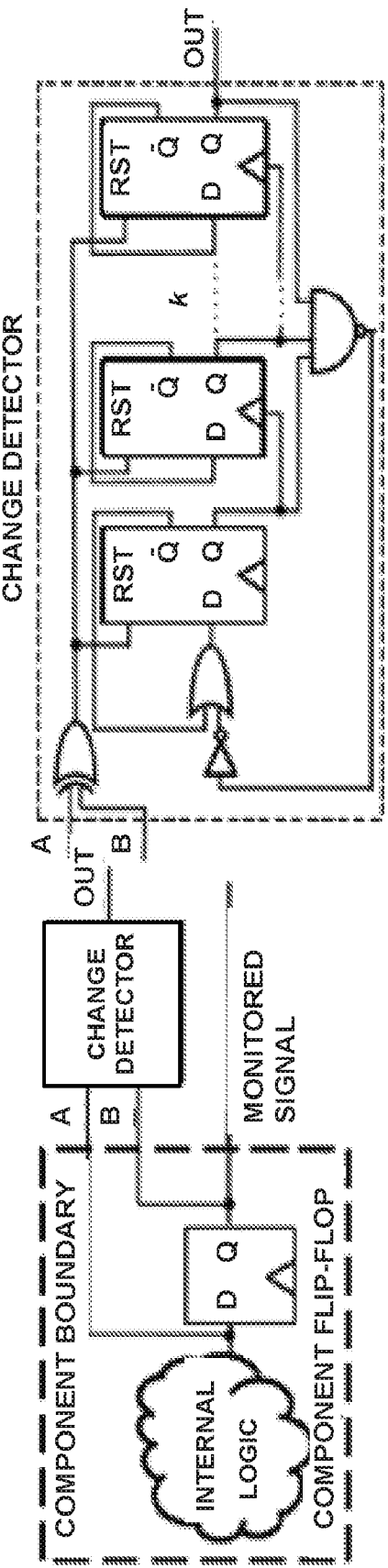
FIGS. 6(A) and 6(B) shows a schematic block diagram of an illustrative change detector for FIG. 6(A) at a high level and FIG. 6(B) change detector details according to an aspect of the present disclosure.

FIG. 6 shows a schematic diagram of a change detector according to an aspect of the present disclosure. We insert change detectors to record changes in the logic values of signals during validation. These change detectors are inserted at the boundaries of all components that may potentially be removed in further analysis (e.g., at a certain level in the RTL hierarchy). For example, for our results shown and described later, change detectors were inserted on all signal lines one hierarchical level below the main SoC module of the OpenSPARC T2 design. They monitored signals between all modules at that level, which includes processor cores, L2 cache banks, memory controllers and I/O controllers.

A change detector includes a k-bit ripple counter that is initialized to all 1's and is reset to all 0's whenever a change in signal values is detected. Due to the short error detection latencies of QED tests, k≈10 is generally sufficient (change window of 1,023). When a QED test detects an error, the system is stopped and the change detector counter values are scanned out and saved. Using the recorded values in the change detectors, a reduced design is created for further analysis. A component is excluded from the analysis by BMC if, during the change window, the change detectors did not record any changes in the logic values of the component's input or output signals.

Partial Instantiation

Advantageously, if a simplified design produced by the change detectors is still too large for the BMC tool or if we need to localize a bug to an even smaller design, a partial instantiation approach can be used. Partial instantiation works through two design reduction techniques. The first technique takes all modules with multiple instantiations and repeatedly reduces their number by half until there is only 1 left. The second technique removes single-instance modules as long as removal of the module does not divide the design into two completely disconnected components.

Figure 7:
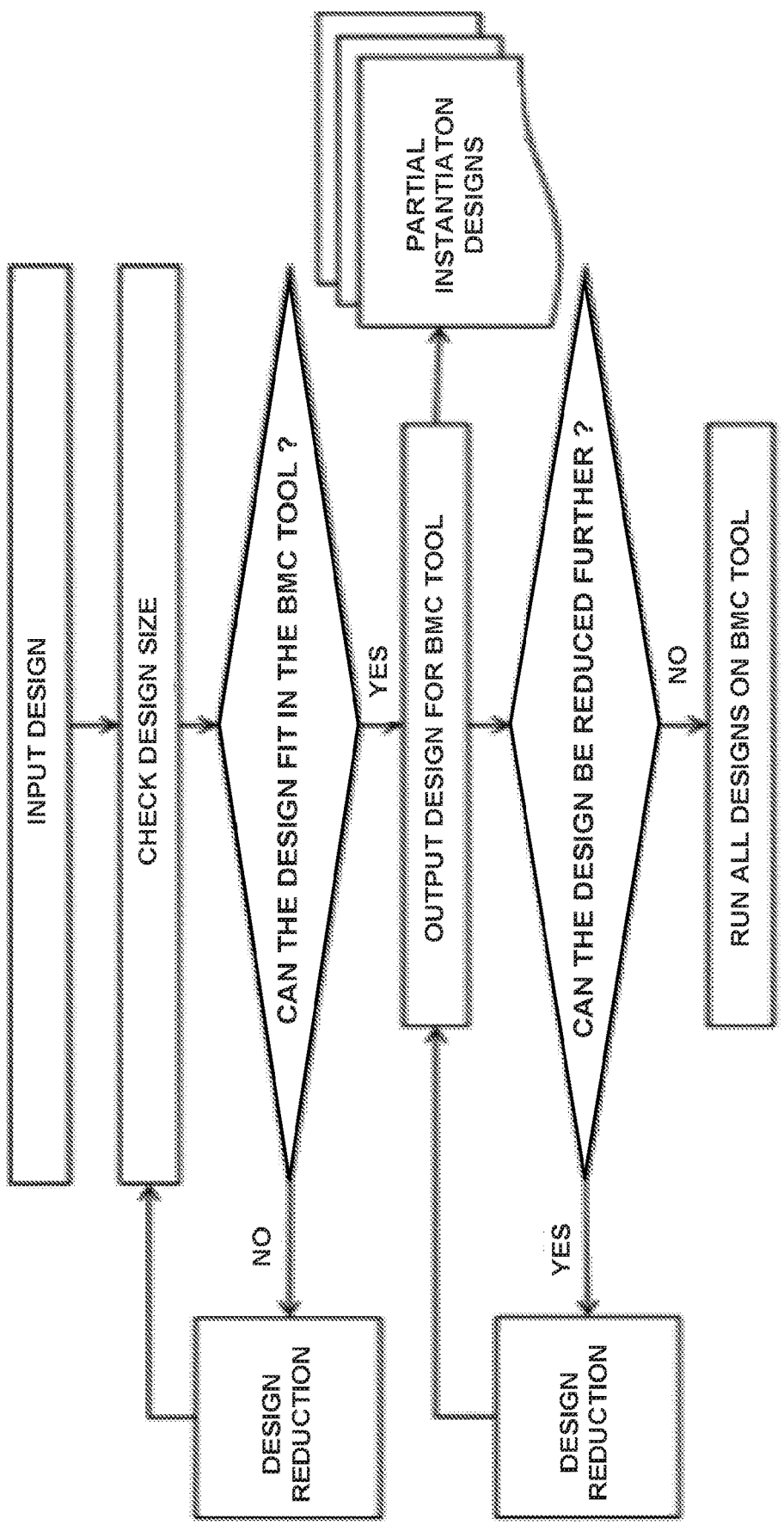
FIG. 7 shows a schematic flow chart for an illustrative partial instantiation approach according to an aspect of the present disclosure.

For example, if a design has a processor core connected to a cache through a crossbar, the crossbar is not removed since it would completely disconnect the processor core from the cache. Since we find bug traces in the form of instructions that execute on processor cores, each analyzed design must contain at least one processor core. FIG. 7 shows the steps for this approach. Once a full set of simplified (partially instantiated) designs is created, they are all analyzed using the BMC tool in parallel.

As an example, we now consider an OpenSPARC T2 with 8 cores, 1 crossbar, 8 caches, 4 memory controllers, and various UI/O controllers. Suppose the I/O controllers are eliminated by the change detectors (there are multiple types of I/O controllers, but each type has only 1 instance), reducing the design to 8 cores, 1 crossbar, 8 caches, and 4 memory controllers. This does not fit in the BMC tool and it is not saved as a partial instantiation. Next, components with multiple instantiations are halved, reducing the design to 4 cores, 1 crossbar, 4 caches and 2 memory controllers.

Unfortunately, this still does not fit in the BMC tool, and so it is not saved as a partial instantiation. The crossbar is not removed as it would disconnect the cores from the other components. In the next reduction step, the design reduces to 2 cores, 1 crossbar, 2 caches and 1 memory controller. This design does fit so we save it. Next, the memory controller can be removed (since there is a single instance). Alternatively, the number of cores and caches can be divided by two. Both of these are saved. Further reductions result in smaller and smaller subsets of the design, each of which is saved. When no more reductions are possible, all of the saved designs are run in parallel.

Results

Figure 8:
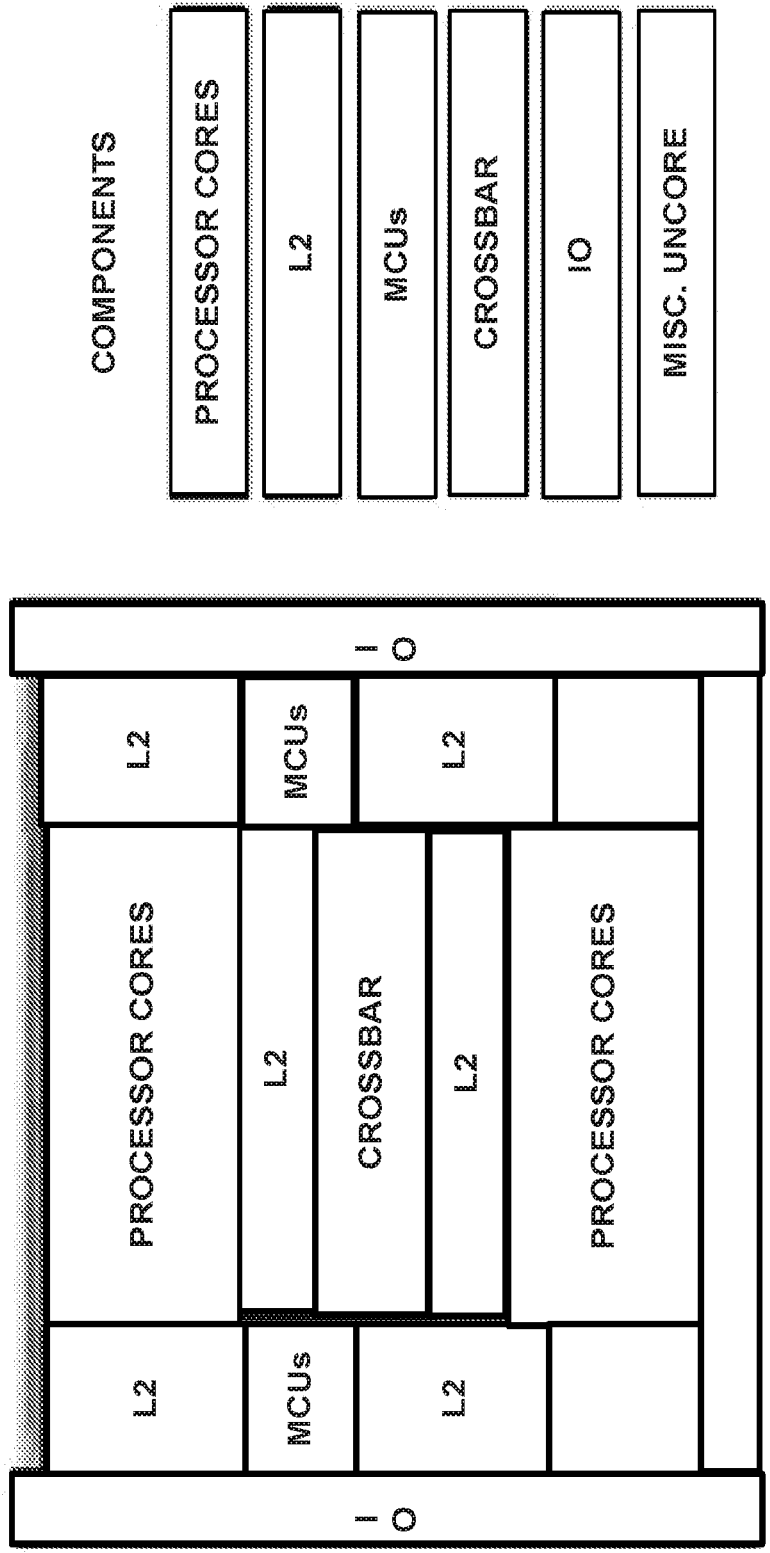
FIG. 8 shows a schematic block diagram illustrating an OpenSPARC T2 diagram according to an aspect of the present disclosure.

With initial reference to FIG. 8—which shows a schematic OpenSPARC T2 diagram—we now demonstrate the effectiveness of Symbolic QED using the OpenSPARC T2 SoC [OpenSPARC], which is the opensource version of the UltraSPARC T2, a 500-million-transistor SoC with 8 processor cores (64 hardware threads), a private L1 cache, 8 banks of shared L2 cache, 4 memory controllers, a crossbar-based interconnect, and various I/O controllers. We simulated logic bug scenarios on the OpenSPARC T2 SoC. These simulated scenarios represent a wide variety of "difficult" bug scenarios extracted from various commercial multicore SoCs. They are considered difficult because they took a long time (days to weeks) to localize. The bug scenarios include bugs in the processor cores, bugs in the uncore components, and bugs related to power management.

We modified the RTL of the OpenSPARC T2 SoC to incorporate these bug scenarios. For the 80 bug scenarios, we set the bug scenario parameter X to 2 clock cycles and bug scenario parameter Y to 2 clock cycles (in particular note that smaller values for X and Y means that bugs are more difficult to detect). For the 12 power management bug scenarios, the activation criteron is set to a sequence of 5 instructions selected from the original test, executed on a designated processor core. This is to emulate a power management controller. When inserting bugs, if a bug is inserted into a component, the bug is in all instances of the component.

For BMC, we used the Questa Formal tool (version 10.2c_3) from Mentor Graphics on an AMD Opteron 6438 with 128 GB of RAM. We used the EDDI-V and the PLC QED transformations to transform an 8-thread version of the FFT test (from SPLASH-2 and an in-house parallelized 8-thread version of the matrix multiplication test (MMULT) into QED tests to detect bugs. The Inst_min and Inst_max QED transformation parameters were set to 100, which typically allow bugs to be detected within a few hundred clock cycles. Note that trying additional tests (beyond FFT and MMULT) was deemed unnecessary because both tests (after QED transformation) were able to detect all 92 bugs (and the BMC step in Symbolic QED is independent of the QED tests that detect the bug). We added the QED module described previously to the RTL of the fetch unit in OpenSPARC T2 processor core. The resulting fetch unit with the QED module was tested in Questa Formal to ensure it correctly transforms a sequence of original instructions into a QED-compatible bug trace. The testing process for 50 sequences of original instructions of varying length (1 to 10 instructions long) took approximately 1 minute of runtime. Moreover, we simulated all of the bug traces produced by Symbolic QED (which depends on the QED module) to ensure that the bug traces indeed activate and detect the corresponding bugs.

The results are summarized in Table 1. The Original (No-QED) column shows results from running the original validation tests (FFT or MMULT) using end-result-checks to check the results of the test against pre-computed, known correct results. The QED column shows results from running the same tests after QED transformation. Note that unlike Symbolic QED, both the Original (No-QED) and the QED tests (without the analysis techniques discussed in Sec. III.E) are only able to report the existence of a bug; they cannot localize a bug (i.e., determine if the bug is in the processor core, in any of the uncore components, or is caused by interactions between the components), nor can they determine very precisely when a bug is activated. The table is categorized into processor core bugs, uncore bugs (here we include bugs that are inside uncore components as well as in the interface between processor cores and uncore components), and power management bugs. Each entry contains two sets of numbers, the top set contains the results obtained from the FFT test, and the bottom set contains results obtained from MMULT. In Table 1, "Bug trace length (instructions)" shows the [minimum, average, maximum] number of instructions in the bug trace. "Bug trace length (cycles)" represents the [minimum, average, maximum] number of clock cycles required to execute the bug trace. The two numbers are different because the Cycles Per Instruction (CPI) is not 1 for all instructions (for example, a load or store instruction may take multiple clock cycles to execute).

For Symbolic QED, the reported length for bug traces corresponds to the number of instructions in the trace found by the BMC tool (not including duplicated instructions created by the QED modules).

For bugs that are only found by executing instructions on multiple processor cores, the number of instructions for each core may be different. For example, one core could have a bug trace that is 3 instructions long, while another core has a bug trace that is 1 instruction long. We report the length of the longest bug trace for the cores (3 in this example) because all cores must complete to activate and detect the bug (and the cores execute the instructions in parallel).

Figure 11:
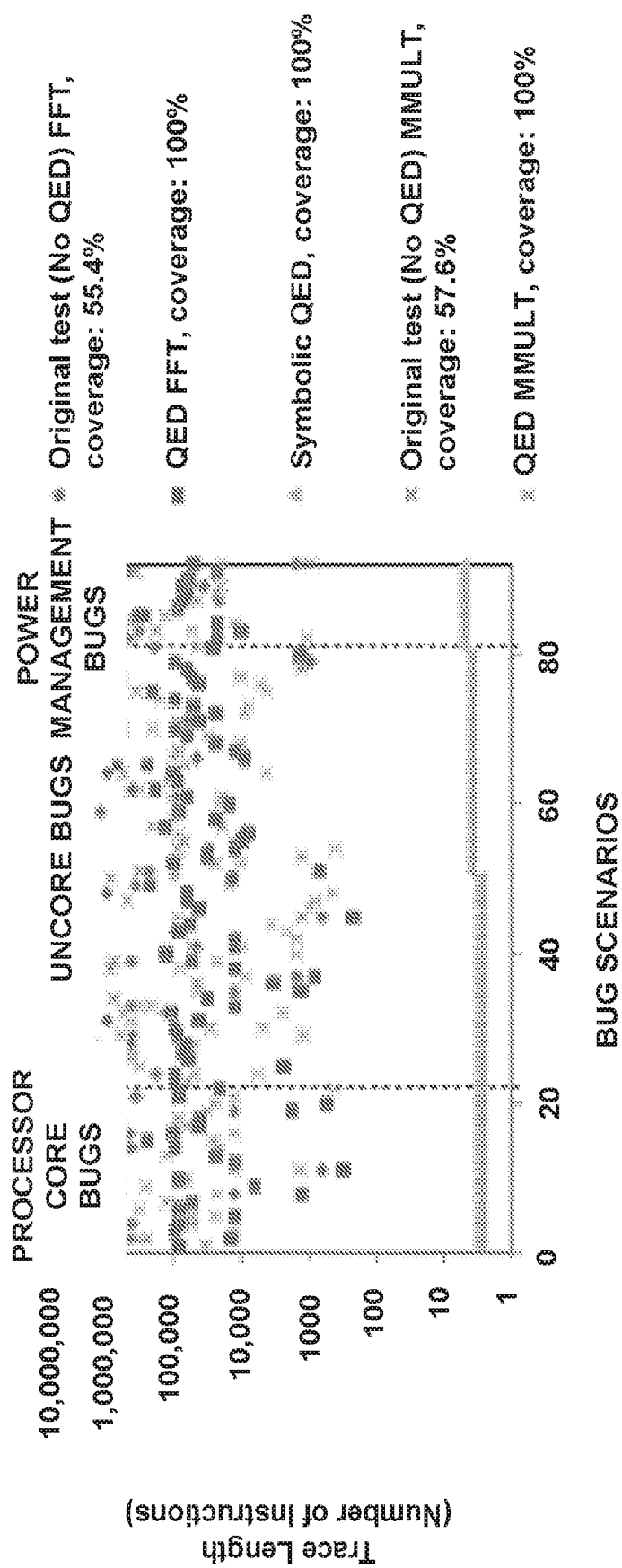
FIG. 11 shows a plot depicting trace lengths for illustrative run of Symbolic QED according to an aspect of the present disclosure.

Observation 1:

Symbolic QED automatically produces bug traces that are up to 6 orders of magnitude shorter than traditional post-silicon validation tests that rely on end-result-checks, and up to 5 orders of magnitude shorter than QED tests. The bug traces produced by Symbolic QED are very short (we confirmed their correctness using simulation). Furthermore, Symbolic QED does not need trace buffers to produce correct bug traces. These are very difficult bugs that took many days or weeks to localize use traditional approaches (also evident by the long bug traces produced by traditional techniques). Short bug traces make debugging much easier. A more detailed visualization of the trace lengths for each bug scenario is shown in FIG. 11. As used in Table 1, "Coverage" is the percentage of the 92 bugs detected. Both Symbolic QED and QED detected all 92 bug scenarios, while the original tests only detected a little more than half of the bugs.

TABLE 1

| | | Original (No QED) | QED | Symbolic QED |
|---|---|---|---|---|
| Processor core only | Bug trace length (instructions) | [643, 551k, 4.9M] [12k, 534k, 2.3M] | [324, 57k, 233k]† [421, 67k, 321k]† | [3, 3, 3] [3, 3, 3] |
| | Bug trace length (clock cycles) | [842, 572k, 5.1M] [15k, 544k, 2.5M] | [367, 66k, 265k]† [522, 69k, 272k]† | [13, 15, 16] [13, 15, 16] |

TABLE 1-continued

|  |  | Original (No QED) | QED | Symbolic QED |
|---|---|---|---|---|
|  | Coverage | 50.0% | 100% | 100% |
|  |  | 54.2% | 100% | 100% |
|  | BMC runtime (minutes) | N/A | N/A | [22, 46, 90] |
|  |  |  |  | [22, 47, 89] |
|  | Bugs localized | 0% | 0% | 100%* |
|  |  | 0% | 0% | 100%* |
| Uncore | Bug trace length (instructions) | [620, 1.6M, 9.8M] | [231, 59k, 232k]† | [3, 4, 4] |
|  |  | [1k, 536k, 2.5M] | [392, 80k, 421k]† | [3, 4, 4] |
|  | Bug trace length (clock cycles) | [722, 1.9M, 11M] | [292, 72k, 289k]† | [14, 22, 29] |
|  |  | [2k, 550k, 2.7M] | [442, 95k, 435k]† | [14, 22, 29] |
|  | Coverage | 55.3% | 100% | 100% |
|  |  | 57.1% | 100% | 100% |
|  | BMC runtime (minutes) | N/A | N/A | [78, 164, 188] |
|  |  |  |  | [76, 163, 190] |
|  | Bugs localized | 0% | 0% | 100%* |
|  |  | 0% | 0% | 100%* |
| Power management | Bug trace length (instructions) | [1.5k, 236k, 495k] | [10k, 68k, 302k]† | [5, 5, 5] |
|  |  | [963, 213k, 422k] | [1k, 47k, 134k]† | [5, 5, 5] |
|  | Bug trace length (clock cycles) | [1.9k, 251k, 512k] | [13k, 75k, 319k]† | [17, 19, 22] |
|  |  | [1.5k, 220k, 430k] | [2k, 49k, 149k]† | [17, 19, 22] |
|  | Coverage | 66.7% | 100% | 100% |
|  |  | 66.7% | 100% | 100% |
|  | BMC runtime (minutes) | N/A | N/A | [205, 266, 333] |
|  |  |  |  | [206, 264, 335] |
|  | Bugs localized | 0% | 0% | 100%* |
|  |  | 0% | 0% | 100%* |

As used therein, "BMC runtime" represents the [minimum, average, maximum] number of minutes it took for the BMC tool to find the bug traces. And "Bugs localized" represents the percentage of bugs localized. Note that both Original (No-QED) and QED tests can only detect bugs, not localize bugs. We did not include any results from running the BMC without our Symbolic QED technique for two reasons: (i) the full design does not load into the BMC tool; and (ii) even if it did, we would need properties to check to run BMC, and there is no clear way to come up with such properties (other than manual insertion which would be subjective and extremely time-consuming).

Observation 2:

Symbolic QED correctly and automatically produces short counter-examples for all bugs in less than 7 hours, without relying on trace buffers. Symbolic QED is effective for large designs such as the OpenSPARC T2, which are challenging when using traditional post-silicon techniques. For Symbolic QED, all of the processor core bugs were detected by either a Normal check or a Store check. Thus, we are able to determine that the bug must be inside the processor cores. This was determined solely based on the QED checks, not because we knew which bugs were simulated. The BMC runtime reported for these bugs corresponds to a BMC run in which only the processor core was loaded. For uncore and power management bugs, the partial instantiation technique (Sec. III.E) was used. Change detectors determined that components such as the I/O controllers were not needed to activate the bugs. The partial instantiations involving the other components were run in parallel. For the OpenSPARC T2, there were 5 parallel runs for each bug; each run corresponded to one of the following partial instantiations, which are ranked by size in descending order.9 1) 2 processor cores, 2 L2 cache banks, 1 memory controller; 2) 1 processor cores, 1 L2 cache bank, 1 memory controller; 3) 2 processor cores, 2 L2 cache banks; 4) 1 processor core, 1 L2 cache bank; and 5) 1 processor core. Recall that if a bug is in a component, it is in all instances of the component. For these bugs, the BMC runtime reported corresponds to the runtime of the smallest partial instantiation that produced a counter-example. Note that this partial instantiation also provides us with a small candidate list of components that may contain the bug. For example, for a given bug, if both partial instances 2 and 5 produce a counter-example, then only the result from partial instance 5 is reported. This is because while both 2 and 5 contain processor cores and caches, 5 does not have a memory controller or a cache bank. This suggests that the memory controller and the cache bank are not required to activate and detect this bug.

Figure 9:
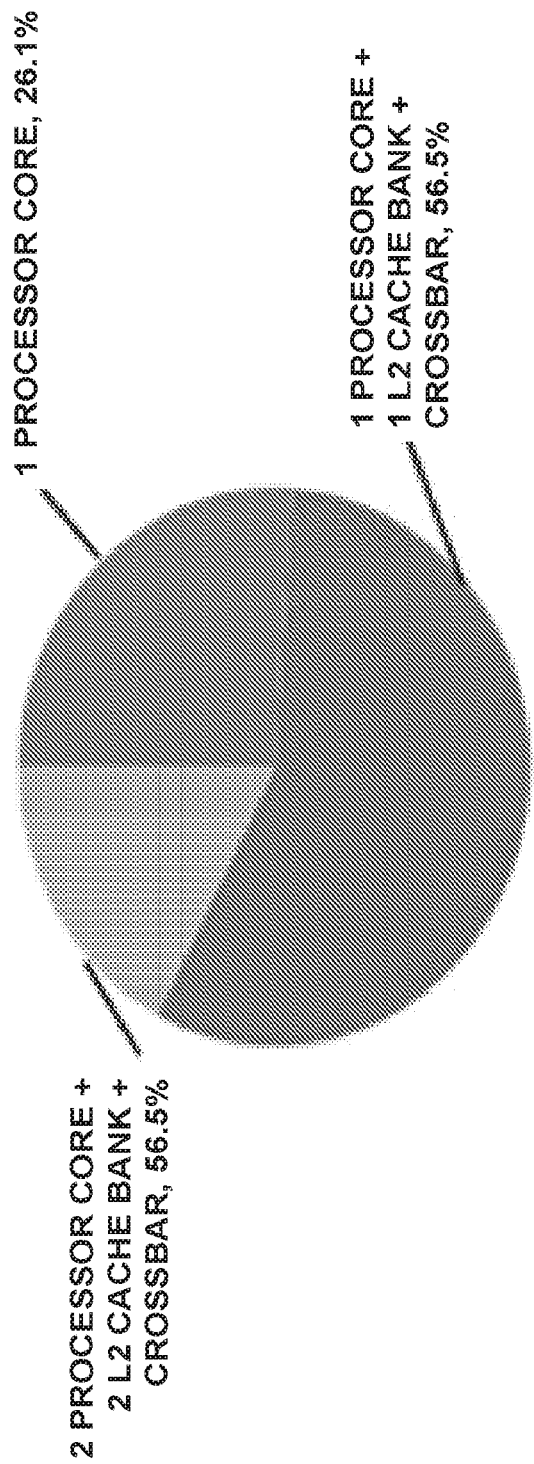
FIG. 9 shows a graph showing the percentage breakdown by list of candidate modules of bugs localized by Symbolic QED where all 92 bugs were correctly localized according to an aspect of the present disclosure.

Observation 3:

Symbolic QED correctly localizes bugs and provides a candidate list of components corresponding to possible locations of bugs in a design. FIG. 9 is a graph showing a breakdown of the bugs localized by Symbolic QED. Symbolic QED localized all 92 bug scenarios. For 26.1% of the bugs, Symbolic QED localized the bugs to exactly 1 processor core; for 56.5% of the bugs, Symbolic QED localized the bug to 1 processor core, 1 L2 cache bank and the crossbar that connects the two; and for 17.4% of the bugs, Symbolic QED localized the bug to 2 processor cores, 2 L2 cache banks, and the crossbar that connects the components. The BMC runtimes reported in Table 1 for Symbolic QED use the QED-consistent initial state constraint discussed previously.

Figure 10:
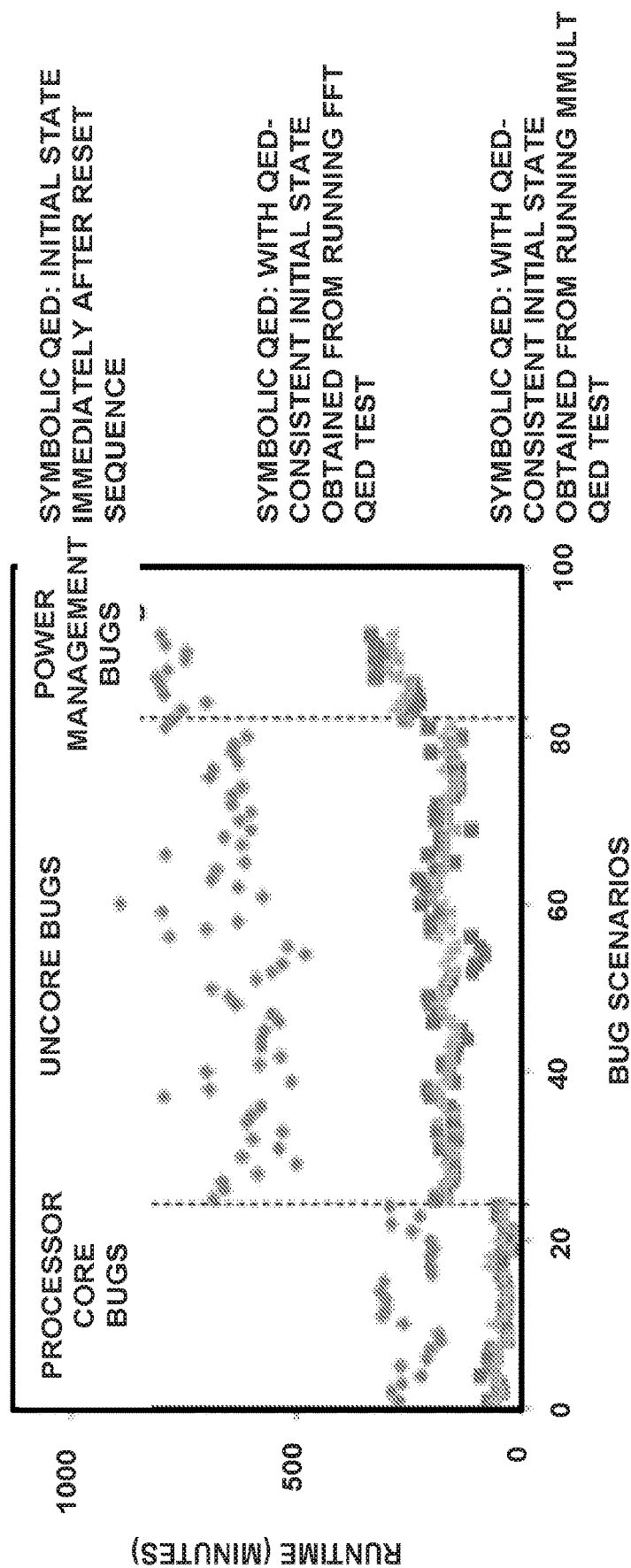
FIG. 10 shows a plot depicting BMC runtimes for an illustrative run of Symbolic QED according to an aspect of the present disclosure.

Detailed runtimes for each bug are presented in FIG. 10. In that FIG. 10, we report three runtimes for each bug: the runtime when starting from the state immediately after a reset sequence (which is QED-consistent in this case), the runtime when starting from a QED-consistent initial state obtained by running the FFT QED test and seeding BMC with the resulting register and memory values, and the runtime when similarly seeding BMC after running MMULT. Results demonstrate that using a QED-consistent initial state obtained by running a QED test achieves up to 5X improvement in runtime compared to starting from the state after reset. Note also that no significant differences were observed between the results from using the FFT test and those using the MMULT test.

To evaluate the change detectors for reducing the design size, we used the same 92 bug scenarios in OpenSPARC T2 and ran the QED-transformed (EDDI-V and PLC) FFT and MMULT tests discussed previously. With a change window of 1,023 cycles, we observed that for these tests, only the processor cores, crossbar, L2 caches and memory controllers were part of the reduced design.

Figure 12:
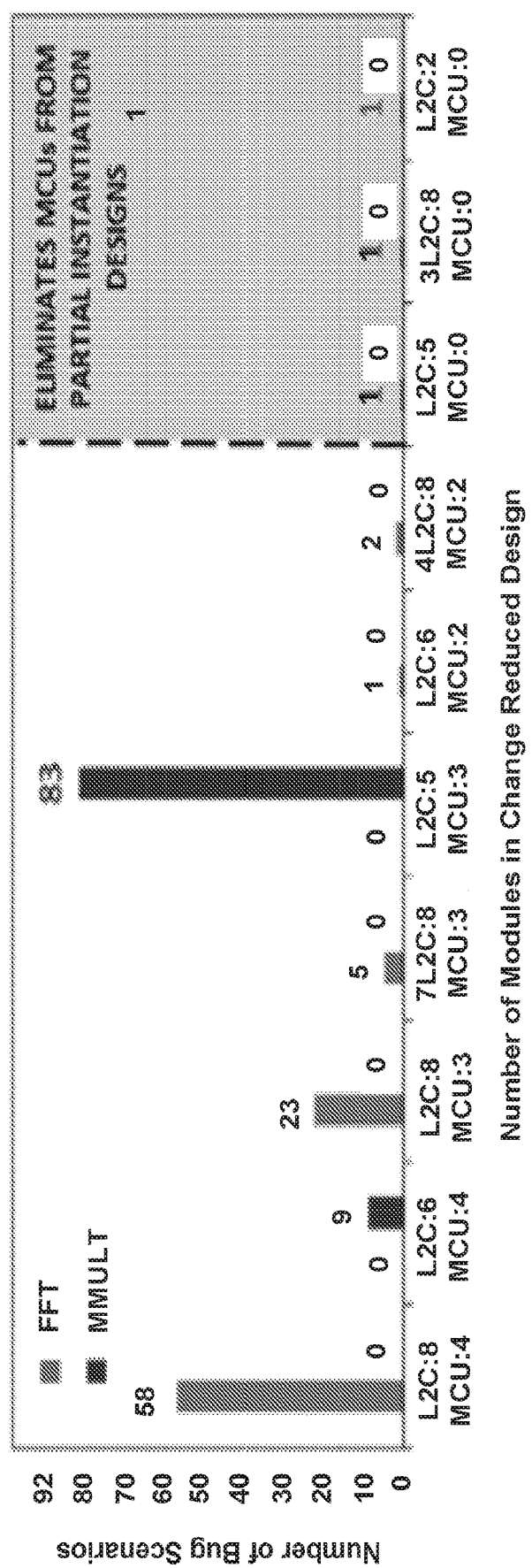
FIG. 12 shows a plot depicting change detector reduced design results for 92 bugs activated during the FFT and MMULT benchmark tests according to an aspect of the present disclosure.
Figure 15:
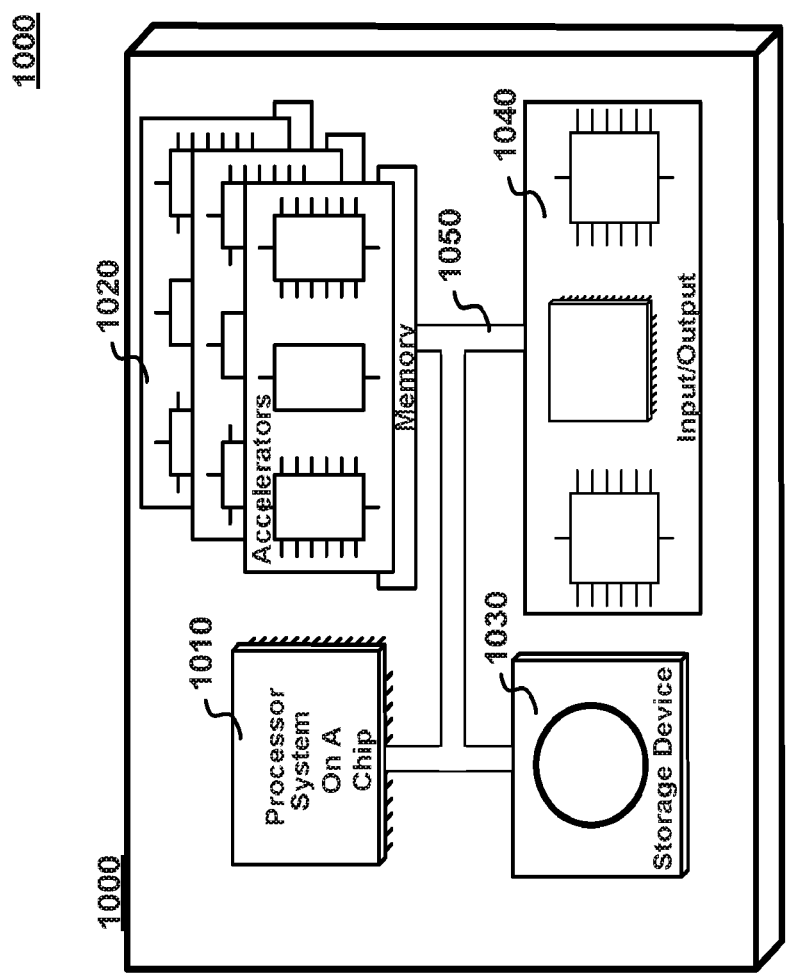
FIG. 15 shows an illustrative computer system on which methods and structures according to the present disclosure may operate and execute.

Other components such as the I/O controllers could thus be removed from the design. For the 92 bugs, as shown in FIG. 12, the number of L2 caches (L2C) and memory controllers (MCU) also varied. For 3 of the bugs (with FFT benchmark) the design size reduced enough to eliminate a module (in each case a memory controller) from the partially instantiated designs. We performed synthesis using the Synopsys Design Compiler with the Synopsys EDK 32 nm library to calculate the chip-level area overhead of the change detectors on OpenSPARC T2 SoC. We inserted change detectors on 1,067 signals with a total of 24,214 bits, thus requiring 24,214 change detectors for the entire design. This resulted in a 1.86% chip-level area overhead. However, given that the change detectors did not reduce the number of memory controllers, caches or cache tags enough to eliminate a partial instantiation design for most of the bugs (see, FIG. 12), in this example we could have omitted the change detectors that only observe signals between those components. The number of signals monitored then drops to 899, requiring only 12,734 bits to be monitored. The area overhead reduces to 0.98%. Thus the partial use of change detectors, generally on peripheral components that see intermittent activity, appears to be the most cost-effective strategy; monitoring components such as caches and memory controllers that have high utilization may not add significant value.

As will be readily appreciated by those skilled in the art, the overhead is significantly less than the 4% overhead of reconfigurable logic for post-silicon debugging. Furthermore, this approach avoids entirely the use of trace buffers (and the associated area overhead). And while we demonstrated the effectiveness of Symbolic QED on the OpenSPARC T2 SoC, Symbolic QED does not rely on any information about the specific implementation of the OpenSPARC T2. As a result, Symbolic QED is applicable to a wide variety of SoC designs.

As will now be understood by those skilled in the art, our Symbolic QED technique relies on the QED technique for creating post-silicon validation tests, but there are important differences. Unlike Symbolic QED, QED alone cannot directly localize bugs. As shown previously, the bug traces obtained by QED can be very long (up to 5 orders of magnitude longer when no trace buffers are used) compared to Symbolic QED. For bugs inside processor cores, Symbolic QED can potentially be further enhanced using techniques such as self-consistency checking. However, prior art self-consistency checking addresses only processor core bugs and our experiences with bugs in commercial SoCs indicate that unicore components are also an important source of difficult bugs in SoCs.

The growing importance of post-silicon validation and debug has motivated much work on bug localization and generation of bug traces. IFRA and the related BLoG techniques for post-silicon bug localization target processors only (and the published results target electrical bugs). The effectiveness of IFRA and BLoG for bugs inside uncore components is unclear. These techniques also require manual efforts—in sharp contrast to Symbolic QED.

Many contemporary post-silicon bug localization approaches rely on trace buffers and assertions. The inadequacy of these techniques has already been discussed. (Some of the heuristics for trace buffer insertion, e.g., restoration ratio and its derivatives only work for logic bugs since they use simulations to compute the logic values of signals that are not traced). In contrast, Symbolic QED does not require any trace buffers or design-specific assertions, and provides a very succinct and generic property to quickly detect and localize logic bugs.

Systems such as BackSpace and its derivatives provide a concrete bug trace once an error is detected or the system crashes by using formal methods to stitch together multiple short traces (or system states) into a longer trace. Some BackSpace derivatives require failure reproduction, which, as we discussed, is challenging due to Heisenbug effects. Other systems, such as nuTAB-BackSpace, addresses some of the failure reproduction challenges but requires design-specific "rewrite rules" to determine if two similar states are equivalent. These rewrite rules have to be manually crafted by designers and require designer intuition, which may be difficult for large designs. Furthermore, the bug traces found may be very long, and unlike Symbolic QED, these techniques cannot reduce the length of the bug traces. Moreover, techniques that solely rely on formal methods for bug localization are not scalable to large designs such as the OpenSPARC T2.

Some formal techniques require specific bugs models which targets a specific model for electrical bugs) may not work for logic bugs, since it is very difficult to create bug models for all logic bugs. Approaches that rely on detailed RTL simulations to obtain the internal states of a design are not scalable for large designs because full system RTL-level simulation of large designs is extremely slow, less than 10 clock cycles per second. And while other techniques for post-silicon bug diagnosis have been presented elsewhere, such techniques may require multiple detailed RTL simulations of the internal states of a design to guide the insertion of hardware structures for debugging. Finally, BuTraMin is a pre-silicon technique for shortening the length of a bug trace. For use in post-silicon validation and debug of large designs, it will require massive simulations to capture logic values of all flip-flops in the system, which will be difficult—if not impossible. Notwithstanding, there may be opportunities to use such techniques after Symbolic QED localizes bugs and produces corresponding short bug traces.

By way of a further illustrative example, we show an EDDI-V transformation example in FIGS. 13(A) and 13(B) wherein FIG. 13(A) shows an original test and FIG. 13(B) shows a transformed test of an illustrative EDDI-V example according to the present disclosure with inst_min= inst_max=3. A PLC example is shown illustratively in FIGS. 14(A) and 14(B) wherein FIG. 14(A) shows transformed code while FIG. 14(B) shows a PLC Operation for a PLC transformation example with inst_min=inst_max=4 according to an aspect of the present disclosure.

Finally, FIG. 10 shows an illustrative computer system 1000 suitable for implementing methods and systems according to an aspect of the present disclosure. As may be immediately appreciated, such a computer system may be integrated into an another system such as a router and may be implemented via discrete elements or one or more integrated components. The computer system may comprise, for example a computer running any of a number of operating systems. The above-described methods of the present disclosure may be implemented on the computer system 1000 as stored program control instructions.

Computer system 1000 includes processor 1010, memory 1020, storage device 1030, and input/output structure 1040. One or more input/output devices may include a display 1045. One or more busses 1050 typically interconnect the components, 1010, 1020, 1030, and 1040. Processor 1010 may be a single or multi core. Additionally, the system may include accelerators etc further comprising the system on a chip.

Processor 1010 executes instructions in which embodiments of the present disclosure may comprise steps described in one or more of the Drawing figures. Such instructions may be stored in memory 1020 or storage device 1030. Data and/or information may be received and output using one or more input/output devices.

Memory 1020 may store data and may be a computer-readable medium, such as volatile or non-volatile memory. Storage device 1030 may provide storage for system 1000 including for example, the previously described methods. In various aspects, storage device 1030 may be a flash memory device, a disk drive, an optical disk device, or a tape device employing magnetic, optical, or other recording technologies.

Input/output structures 1040 may provide input/output operations for system 1000.

CONCLUSION

At this point those skilled in the art will readily appreciate our Symbolic QED technique, a structured and automated approach that overcomes post-silicon validation and debug challenges. Advantageously, Symbolic QED automatically detects and localizes logic bugs in post-silicon validation and provides a list of candidate components that may contain the bugs. In addition, Symbolic QED produces bug traces that are up to 6 orders of magnitude shorter than traditional post-silicon validation tests that rely on end-result-checks, and up to 5 orders of magnitude shorter than QED tests. Symbolic QED is completely automated, does not require human intervention, and does not need trace buffers. Symbolic QED is both effective and practical, as demonstrated on the OpenSPARC T2, where it correctly localized 92 difficult logic bugs abstracted from bugs that occurred in post-silicon validation of various commericial multicore SoCs. Notably, these are known to be difficult logic bugs that originally took many days or weeks to localize. In contrast, other formal techniques may take days or fail completely for large designs such as the OpenSPARC T2.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A computer implemented method for the post-silicon validation and debug of a digital hardware system comprising the steps of:
   inserting, automatically and systematically a number of change detectors into the digital hardware system during a design phase of that hardware system;
   running, a number of quick error detection (QED) tests on that hardware system having the inserted change detectors wherein the change detectors record debug information during the running;
   determining, whether an error (bug) was detected by the QED tests; and
   if a bug was detected by the QED tests then localizing the detected bug and generating a minimal bug trace through the use of a formal analysis; and
   outputting a set of candidate location(s) for each detected bug and the minimal bug trace(s).

2. The computer implemented method of claim 1 wherein the digital system is a System on a Chip (SoC) having at least one programmable processor.

3. The computer implemented method of claim 2 further comprising:
   stopping the system when QED test(s) detects an error;
   saving any change detector value(s); and
   using the saved change detector value(s), generating a reduced design for further analysis;
   wherein the reduced design excludes any components from BMC analysis if, during a change window, change detector(s) associated with those components did not record any changes in the logic values of the components input or output signals.

4. The computer implemented method of claim 1 wherein the formal analysis employs bounded model checking (BMC) methodology.

5. The computer implemented method according to claim 4 comprising ensuring that only QED-compatible bug traces are considered by BMC by adding a new QED module to a fetch stage of each processor core during BMC.

6. The computer implemented method according to claim 5 wherein the QED module automatically transforms a sequence of original instructions into a QED-compatible sequence.

7. The computer implemented method according to claim 6 further comprising establishing a QED-consistent state before starting the BMC.

8. The computer implemented method of claim 7 wherein the change detectors are inserted at boundaries of all components that may potentially be removed during a further analysis.

9. The computer implemented method of claim 1 wherein the QED employs a number of QED transformations selected from the group consisting of Error Detection using Duplicated Instructions for Validation (EDDI-V) and Proactive Load and Check (PLC) transformations.

10. The computer implemented method of claim 1 wherein the change detectors include a k-bit ripple counter that is initialized to all 1's and is reset to all 0's whenever a change in signal value is detected.

* * * * *